United States Patent
Nunnink et al.

(10) Patent No.: US 10,712,529 B2
(45) Date of Patent: Jul. 14, 2020

(54) LENS ASSEMBLY WITH INTEGRATED FEEDBACK LOOP FOR FOCUS ADJUSTMENT

(71) Applicant: Cognex Corporation, Natick, MA (US)

(72) Inventors: Laurens Nunnink, Simpleveld (NL); Rene Delasauce, Aachen (DE); William Equitz, Brookline, MA (US)

(73) Assignee: Cognex Corporation, Natick, MA (US)

( * ) Notice: Subject to any disclaimer, the term of this patent is extended or adjusted under 35 U.S.C. 154(b) by 500 days.

(21) Appl. No.: 13/800,055

(22) Filed: Mar. 13, 2013

(65) Prior Publication Data

US 2014/0268361 A1   Sep. 18, 2014

(51) Int. Cl.
| | |
|---|---|
| G02B 1/06 | (2006.01) |
| G02B 7/08 | (2006.01) |
| G02B 3/14 | (2006.01) |
| G02B 7/30 | (2006.01) |
| G02B 7/38 | (2006.01) |

(52) U.S. Cl.
CPC .................. *G02B 7/08* (2013.01); *G02B 3/14* (2013.01); *G02B 7/30* (2013.01); *G02B 7/38* (2013.01)

(58) Field of Classification Search
CPC ....................................................... G02B 3/14
USPC .................................................. 359/665, 666
See application file for complete search history.

(56) References Cited

U.S. PATENT DOCUMENTS

| | | | |
|---|---|---|---|
| 5,973,852 A | 10/1999 | Task | |
| 6,081,388 A | 6/2000 | Widl | |
| 6,188,526 B1 | 2/2001 | Sasaya et al. | |
| 6,344,930 B1 * | 2/2002 | Kaneko | G02B 3/14 |
| | | | 348/E5.045 |
| 6,898,021 B1 | 5/2005 | Tang | |
| 7,296,746 B2 | 11/2007 | Philyaw | |
| 7,382,545 B2 | 6/2008 | Jung | |
| 7,436,587 B2 | 10/2008 | Feldman | |
| 7,453,646 B2 | 11/2008 | Lo | |

(Continued)

FOREIGN PATENT DOCUMENTS

| | | |
|---|---|---|
| CN | 104315995 A | 1/2015 |
| EP | 1583354 A3 | 10/2006 |

(Continued)

*Primary Examiner* — James C. Jones (74) *Attorney, Agent, or Firm* — Loginov & Associates, PLLC; William A. Loginov (57) ABSTRACT

This invention provides a removably mountable lens assembly for a vision system camera that includes an integral auto-focusing liquid lens unit, in which the lens unit compensates for focus variations by employing a feedback control circuit that is integrated into the body of the lens assembly. The feedback control circuit receives motion information related to the bobbin of the lens from a position sensor (e.g. a Hall sensor) and uses this information internally to correct for motion variations that deviate from the lens setting position at a desired lens focal distance setting. Illustratively, the feedback circuit can be interconnected with one or more temperature sensors that adjust the lens setting position for a particular temperature value. In addition, the feedback circuit can communicate with an accelerometer that reads a direction of gravity and thereby corrects for potential sag in the lens membrane based upon the spatial orientation of the lens.

31 Claims, 8 Drawing Sheets

(56) References Cited

U.S. PATENT DOCUMENTS

| | | |
|---|---|---|
| 7,466,493 B2 | 12/2008 | Kim et al. |
| 7,490,576 B2 | 2/2009 | Metcalfe et al. |
| 7,710,535 B2 | 5/2010 | Nomura |
| 7,742,075 B2 | 6/2010 | Kimura |
| 7,755,841 B2 | 7/2010 | Christenson et al. |
| 7,855,838 B2 | 12/2010 | Jannard et al. |
| 8,027,095 B2 | 9/2011 | Havens |
| 8,035,624 B2 | 10/2011 | Bell et al. |
| 8,072,689 B2 | 12/2011 | Bolis |
| 8,154,805 B2 | 4/2012 | Jannard et al. |
| 8,169,709 B2 | 5/2012 | Jannard et al. |
| 8,203,628 B2 | 6/2012 | Honjo et al. |
| 8,284,275 B2 | 10/2012 | Abe |
| 8,363,149 B2 | 1/2013 | Yumiki |
| 8,381,976 B2 | 2/2013 | Mohideen et al. |
| 8,405,680 B1 | 3/2013 | Lopes et al. |
| 8,472,122 B2 | 6/2013 | Obu et al. |
| 8,545,555 B2 | 10/2013 | Berge |
| 8,548,270 B2 | 10/2013 | Katz et al. |
| 8,576,390 B1 | 11/2013 | Nunnink |
| 8,794,521 B2 | 8/2014 | Joussen et al. |
| 8,983,233 B2 | 3/2015 | Katz et al. |
| 9,270,974 B2 | 2/2016 | Zhang et al. |
| 9,760,837 B1 | 9/2017 | Nowozin et al. |
| 9,805,454 B2 | 10/2017 | Hudman |
| 2001/0050758 A1 | 12/2001 | Suzuki et al. |
| 2003/0095238 A1 | 5/2003 | Imafuku et al. |
| 2004/0228003 A1 | 11/2004 | Takeyama et al. |
| 2005/0058337 A1 | 3/2005 | Fujimura et al. |
| 2006/0047039 A1 | 3/2006 | Kato et al. |
| 2006/0257142 A1 | 11/2006 | Tanaka |
| 2007/0170259 A1 | 7/2007 | Nunnink et al. |
| 2007/0216851 A1 | 9/2007 | Matsumoto |
| 2008/0055425 A1 | 3/2008 | Kuiper |
| 2008/0062529 A1 | 3/2008 | Helwegen et al. |
| 2008/0231966 A1 | 9/2008 | Hendriks et al. |
| 2008/0273760 A1 | 11/2008 | Metcalfe et al. |
| 2008/0277477 A1 | 11/2008 | Thuries |
| 2008/0277480 A1 | 11/2008 | Thuries et al. |
| 2009/0072037 A1 | 3/2009 | Good et al. |
| 2009/0141365 A1 | 6/2009 | Jannard et al. |
| 2009/0162601 A1 | 6/2009 | Dickover et al. |
| 2009/0302197 A1* | 12/2009 | Uchino ............... H04N 5/2254 250/201.4 |
| 2010/0039709 A1 | 2/2010 | Lo |
| 2010/0231783 A1 | 9/2010 | Bueler et al. |
| 2010/0243862 A1 | 9/2010 | Nunnink |
| 2010/0276493 A1* | 11/2010 | Havens et al. ............... 235/470 |
| 2010/0322612 A1 | 12/2010 | Tsuda et al. |
| 2011/0158634 A1 | 6/2011 | Craen et al. |
| 2011/0176221 A1 | 7/2011 | Tanaka |
| 2011/0205340 A1 | 8/2011 | Garcia et al. |
| 2011/0229840 A1 | 9/2011 | Liang |
| 2011/0274372 A1 | 11/2011 | Bianchi et al. |
| 2012/0037705 A1 | 2/2012 | Mohideen et al. |
| 2012/0062725 A1 | 3/2012 | Wampler, II et al. |
| 2012/0092485 A1 | 4/2012 | Meinherz et al. |
| 2012/0105707 A1 | 5/2012 | Futami et al. |
| 2012/0143004 A1 | 6/2012 | Gupta et al. |
| 2012/0160918 A1 | 6/2012 | Negro |
| 2012/0200764 A1 | 8/2012 | Afshari et al. |
| 2012/0261474 A1 | 10/2012 | Kawashime |
| 2012/0261551 A1 | 10/2012 | Rogers |
| 2012/0281295 A1 | 11/2012 | Jannard et al. |
| 2013/0021087 A1 | 1/2013 | Rosset et al. |
| 2014/0183264 A1 | 7/2014 | Nunnink |
| 2014/0268361 A1 | 9/2014 | Nunnink |
| 2015/0260830 A1 | 9/2015 | Ghosh et al. |
| 2016/0127715 A1 | 5/2016 | Shotton et al. |
| 2016/0292522 A1 | 10/2016 | Chen et al. |
| 2016/0306046 A1 | 10/2016 | Axelsson et al. |
| 2016/0375524 A1 | 12/2016 | Hsu |

FOREIGN PATENT DOCUMENTS

| | | |
|---|---|---|
| EP | 1837689 | 9/2007 |
| JP | H10527165 | 2/1993 |
| JP | 2006520007 | 8/2006 |
| JP | 2009505543 | 2/2009 |
| JP | 2011218156 | 11/2011 |
| WO | 2004083899 | 9/2004 |
| WO | 2007020451 | 2/2007 |

* cited by examiner

LENS ASSEMBLY WITH INTEGRATED FEEDBACK LOOP FOR FOCUS ADJUSTMENT

FIELD OF THE INVENTION

This application relates to cameras used in machine vision and more particularly to automatic focusing lens assemblies.

BACKGROUND OF THE INVENTION

Vision systems that perform measurement, inspection, alignment of objects and/or decoding of symbology (e.g. bar codes, or more simply "IDs") are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader, the user or automated process acquires an image of an object that is believed to contain one or more IDs. The image is processed to identify ID features, which are then decoded by a decoding process and/or processor to obtain the inherent information (e.g. alphanumeric data) that is encoded in the pattern of the ID.

Often, a vision system camera includes an internal processor and other components that allow it to act as a standalone unit, providing a desired output data (e.g. decoded symbol information) to a downstream process, such as an inventory tracking computer system or logistics application. It is often desirable that the camera assembly contain a lens mount, such as the commonly used C-mount, that is capable of receiving a variety of lens configurations. In this manner, the camera assembly can be adapted to the specific vision system task. The choice of lens configuration can be driven by a variety of factors, such as lighting/illumination, field of view, focal distance, relative angle of the camera axis and imaged surface, and the fineness of details on the imaged surface. In addition, the cost of the lens and/or the available space for mounting the vision system can also drive the choice of lens.

An exemplary lens configuration that can be desirable in certain vision system applications is the automatic focusing (auto-focus) assembly. By way of example, an auto-focus lens can be facilitated by a so-called liquid lens assembly. One form of liquid lens uses two iso-density liquids—oil is an insulator while water is a conductor. The variation of voltage passed through the lens by surrounding circuitry leads to a change of curvature of the liquid-liquid interface, which in turn leads to a change of the focal length of the lens. Some significant advantages in the use of a liquid lens are the lens' ruggedness (it is free of mechanical moving parts), its fast response times, its relatively good optical quality, and its low power consumption and size. The use of a liquid lens can desirably simplify installation, setup and maintenance of the vision system by eliminating the need to manually touch the lens. Relative to other auto-focus mechanisms, the liquid lens has extremely fast response times. It is also ideal for applications with reading distances that change from object-to-object (surface-to-surface) or during the changeover from the reading of one object to another object—for example in scanning a moving conveyor containing differing sized/height objects (such as shipping boxes). In general, the ability to quickly focus "on the fly" is desirable in many vision system applications.

A recent development in liquid lens technology is available from Optotune AG of Switzerland. This lens utilizes a movable membrane covering a liquid reservoir to vary its focal distance. A bobbin exerts pressure to alter the shape of the membrane and thereby vary the lens focus. The bobbin is moved by varying the input current within a preset range. Differing current levels provide differing focal distances for the liquid lens. This lens advantageously provides a larger aperture (e.g. 6 to 10 millimeters) than competing designs (e.g. Varioptic of France) and operates faster. However, due to thermal drift and other factors, there may be variation in calibration and focus setting during runtime use, and over time in general. A variety of systems can be provided to compensate and/or correct for focus variation and other factors. However, these can require processing time (within the camera's internal processor) that slows the lens' overall response time in coming to a new focus. It is recognized generally that a control frequency of at least approximately 1000 Hz may be required to adequately control the focus of the lens and maintain it within desired ranges. This poses a burden to the vision system's processor, which can be based on a DSP or similar architecture. That is vision system tasks would suffer if the DSP were continually preoccupied with lens-control tasks.

SUMMARY OF THE INVENTION

This invention overcomes disadvantages of the prior art by providing a removably mountable lens assembly for a vision system camera that includes an integral auto-focusing, liquid lens unit, in which the lens unit compensates for focus variations by employing a feedback control circuit that is integrated into the body of the lens assembly. The feedback control circuit receives motion information related to and actuator, such as a bobbin (which variably biases the membrane under current control) of the lens from a position sensor (e.g., a Hall sensor) and uses this information internally to correct for motion variations that deviate from the lens setting position at a target lens focal distance setting. The defined "position sensor" can be a single (e.g. Hall sensor) unit or a combination of discrete sensor's located variously with respect to the actuator/bobbin to measure movement at various locations around the lens unit. Illustratively, the feedback circuit can be interconnected with one or more temperature sensors that adjust the lens setting position for a particular temperature value. In addition, the feedback circuit can communicate with an accelerometer that senses the acting direction of gravity, and thereby corrects for potential sag (or other orientation-induced deformation) in the lens membrane based upon the spatial orientation of the lens.

In an illustrative embodiment, a lens assembly for a vision system camera having variable focus provides a lens body having a variable lens assembly and a fixed optics assembly. A controller (control circuit) is located within the body. The controller is constructed and arranged to receive a target focal distance from the vision system camera. The controller generates a target position of an actuator that controls curvature of the variable lens assembly. Based upon an actual measured position of the actuator, the controller corrects the measured position of the actuator to the target continuously, in a feedback loop. Illustratively, the variable lens assembly includes a membrane-based liquid lens element in which the membrane curvature is driven by a moving actuator. The liquid lens element can include a position sensor located to measure movement of the actuator associated with movement of a membrane of the membrane-based liquid lens assembly. This position sensor can comprise one or more linear Hall sensor(s) that measure(s) a magnet positioned to move on the actuator. The actuator can be a bobbin that is driven by current using a current controller operatively connected with the controller. The target position information illustratively defines a position that focuses an image acquired by the vision system camera. Additionally, the target position information can be further corrected by the controller for at least one of temperature of the liquid lens assembly, spatial orientation and/or other parameters (e.g. flange-to-sensor distance tolerance) of the liquid lens assembly. Thus, the controller converts this information into a corrected target position value for the Hall sensor. The corrected position information is determined by the controller based upon stored calibration parameters that reside in the memory (e.g. an EEPROM of the lens assembly). The calibration parameters can relate to temperature of the lens, provided by a temperature sensor, spatial orientation of the lens, provided by an accelerometer, and/or other parameters, such as flange-to-sensor distance tolerance. The controller can also allow for upgrade of its process instructions (firmware) via the communication network (e.g. an I2C communication interface), typically upon startup. This firmware upgrade is received from the vision system if newer information is available from it.

Illustratively, the controller can reside on a circuit board that is positioned on a shelf surrounded by a cap assembly. The (e.g., cylindrical) cap assembly surrounds a filler having the shelf and a main barrel assembly that contains the fixed optics therein. The cap assembly is operatively connected to the filler containing the shelf. It is selectively rotatable about an optical axis with respect to the main barrel assembly. The main barrel assembly includes a mount base constructed and arranged to removably secure to a mount of the vision system camera so that the lens assembly is exchangeable. The controller illustratively indicates when the lens position has moved to a corrected position.

In an illustrative embodiment, a method for controlling focus of a membrane-based liquid lens assembly of a vision system camera in the form of a "local" feedback loop (i.e. using a lens-assembly based controller/processor includes measuring of a present position of an actuator of the membrane-based liquid lens assembly with a position sensor. A target position of the actuator is received from an interconnected vision system processor of the vision system camera in the form of a focal distance. This distance is interpreted into the target position of the actuator by the controller. The controller (locally mounted in a body of the lens assembly) compares the measured, actual position of the actuator with the target position, and determines whether the two positions are currently substantially equal. If the values are substantially equal, then a correct position is indicated by the controller. If the values are sufficiently unequal, then the controller sends a correction to the actuator and repeats the above steps in a feedback loop that continuously maintains correct position based upon the current target.

BRIEF DESCRIPTION OF THE DRAWINGS

The invention description below refers to the accompanying drawings, of which.

DETAILED DESCRIPTION

Figure 1:
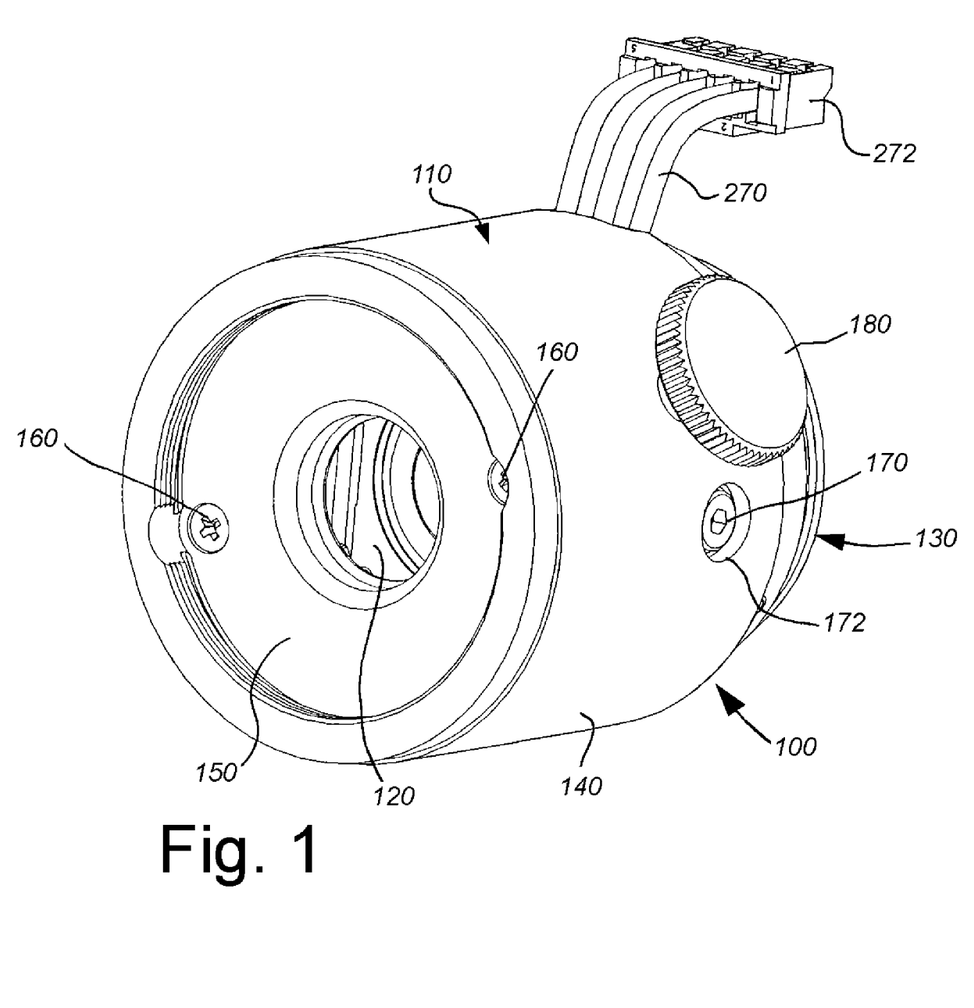
FIG. 1 is a perspective view of the external structure of an exchangeable auto-focus lens assembly with integrated feedback-loop-based focus control according to an illustrative embodiment.

FIG. 1 details the external structure of an exchangeable, auto-focus lens assembly (also simply termed "lens assembly") 100 according to an illustrative embodiment. The lens assembly includes an outer cap 110 defining a generally cylindrical shape. This outer cap 110 provides a protective and supporting shell for a variable focus lens element (comprising an Optotune membrane-based liquid lens model EL-6-18 or EL-10-30 in this exemplary embodiment) 120. By way of useful background information the present data sheet with specifications for various models of this lens is available on the World Wide Web at www.optotune.com/images/products/Optotune%20EL-6-18.pdf. It is expressly contemplated that the teachings of the embodiments herein can be applied to a variety of electronically focused lens types including other forms of liquid lens technology and electro-mechanically adjusted solid lenses. For the purposes of this description, the variable focus lens element 120 (also simply termed the "liquid lens") of the overall auto-focus lens assembly 100 is assumed to operate based upon predetermined inputs of current (or voltage in alternate arrangements), and provides various outputs that the user can employ to monitor and control the lens using conventional techniques. Such outputs can include the position of the bobbin using, for example, one or more Hall sensors (described further below) and/or the present temperature of the lens using one or more conventional temperature sensors.

By way of further background, it has been observed that such liquid lenses exhibit excessive drift of its optical power over time and temperature. Although the lens can be focused relatively quickly to a new focal position (i.e. within 5 milliseconds), it tends to drift from this focus almost immediately. The initial drift (or "lag") is caused by latency in the stretch of the membrane from one focus state to the next— i.e. the stretch takes a certain amount of time to occur. A second drift effect with a longer time constant is caused by the power dissipation of the lens' actuator bobbin heating up the lens membrane and liquid. In addition the orientation of the lens with respect to the acting direction of gravity can cause membrane sag that has an effect on focus. The system and method of the embodiments described herein address disadvantages observed in the operation and performance such liquid lenses.

The rear 130 of the lens assembly 100 includes a threaded base that can be adapted to seat in a standard camera mount, such as the popular cine or (C-mount). While not shown, it is expressly contemplated that the lens assembly 100 can be (removably) mounted a variety of camera types adapted to perform vision system tasks with an associated vision system processor.

Figure 2:
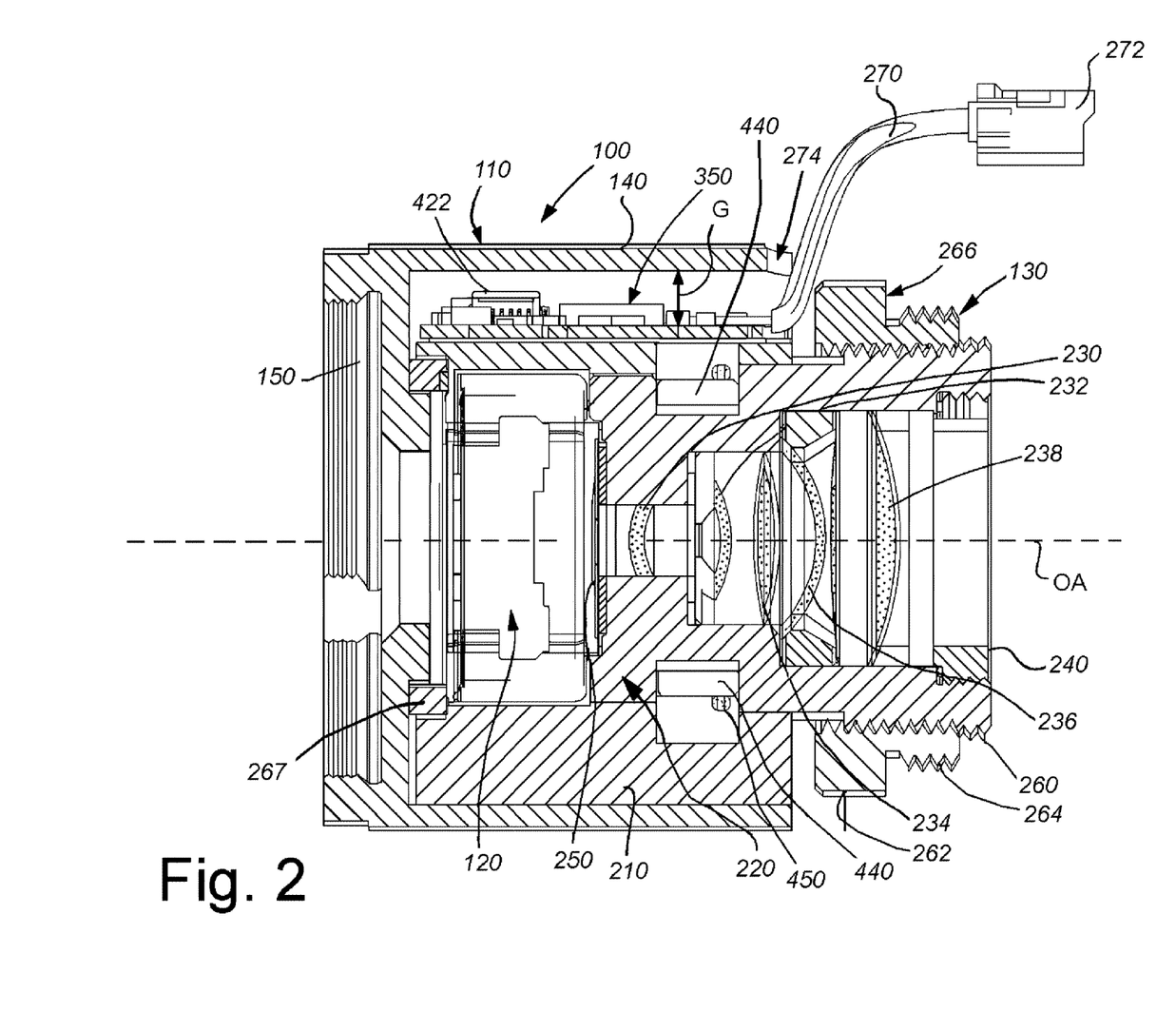
FIG. 2 is a side cross section of the lens assembly of FIG. 1 showing the layout of internal mechanical, optical, electro-optical and electronic components.
Figure 3:
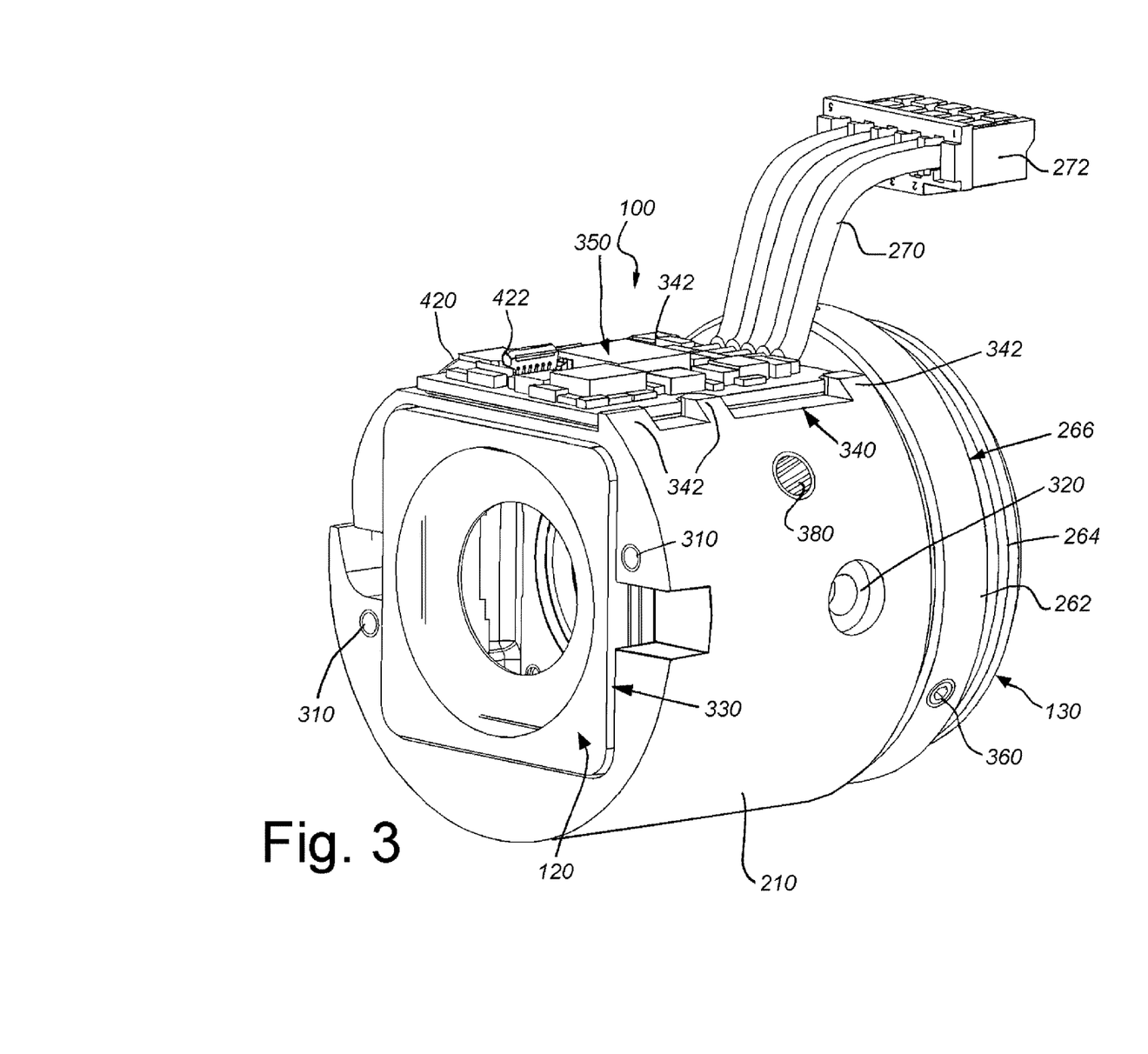
FIG. 3 is a perspective view of the lens assembly of FIG. 1 with outer cap removed to reveal the arrangement of components.
Figure 4:
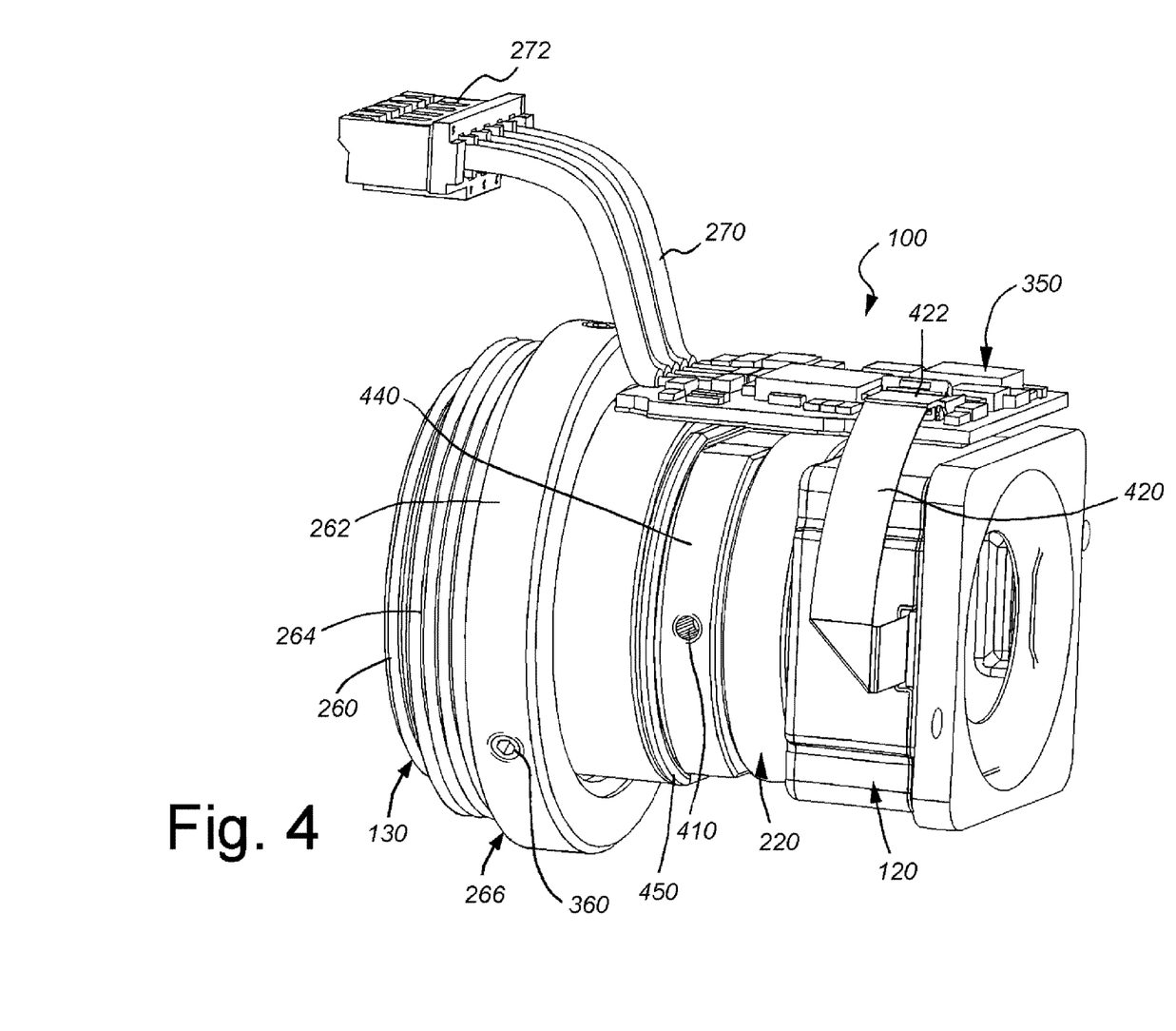
FIG. 4 is a perspective view of the lens assembly of FIG. 1 with the outer cap and spacer assembly removed to reveal the interconnection between the liquid lens and the control circuit.

With further reference also to FIGS. 2-4, the construction of the lens assembly 100 is described in further detail. It is expressly contemplated that the depicted construction is illustrative of a range of possible arrangements of components that should be clear to those of skill in the art. The cap 110 defines a metal shell (for example aluminum alloy) that includes a side skirt 140 and unitary front face 150. The cap overlies a spacer/filler 210 (see also FIG. 3). This filler 210 includes a pair of threaded holes 310 (FIG. 3) that receive threaded fasteners 160 to removably secure the cap over the filler 210. A pair of opposing threaded fasteners 170 are recessed in corresponding holes 172 of the cap and pass through holes 320 in the filler 210 and into threaded holes 410 (FIG. 4) on two keys 440 that rotatably engage the main lens barrel assembly 220 (FIGS. 2 and 4). This relationship is described further below. These fasteners 170 maintain the main lens barrel assembly 220 in axial alignment with the filler 210.

As shown in FIG. 2, the lens barrel assembly 220 contains a series of fixed lenses 230, 232, 234, 236 and 238 arranged according to ordinary optical skill behind the liquid lens 210. These lenses allow the image projected along the optical axis OA to the vision system sensor to be sized appropriately to the sensor's area over a range of varying focal distances specified for the lens assembly. By way of example, the range of optical power can be −2 to +10 diopter. The lenses 230-238 are arranged in a compressed stack within the main barrel assembly 220 with appropriate steps and/or spacers therebetween. The overall stack is held in place by a threaded retaining ring 240 at the rear end (130) of the lens assembly 110. At the front of the main barrel is located an aperture stop disc 250 that reduces the system aperture to an appropriate, smaller diameter. This allows customization of brightness/exposure control and/or depth of field for a given vision system application.

The main barrel assembly 220 includes a rear externally threaded base 260 having a diameter and thread smaller than that of a C-mount—for example a conventional M-12 mount size for interchangeability with camera's employing this standard, or another arbitrary thread size. A threaded mount ring 262 with, for example, a C-mount external thread 264 is threaded over the base thread 260. This ring 262 allows the back focus of the lens with respect to the camera sensor to be accurately set. In general, the shoulder 266 of the ring is set to abut the face of the camera mount when the lens is secured against the camera body. A pair of set screws 360 (FIGS. 3 and 4) pass through the ring 262, and removably engage the base thread 260 to maintain the mount ring 262 at an appropriate back focus setting.

An O-ring 267 is provided on the front face of the liquid lens 120 to cancel out tolerances. In addition, and with reference also to FIG. 4, filler 210 is adapted to rotate with respect to the main barrel assembly 220. A pair of semi-circular keys 440, held together by an O-ring 450 engage a groove in the filler 210 and allow the filler 210 and cap 110 to rotate with respect to the barrel assembly 220 about the axis OA, while fixing these components along the axial direction. In this manner, after the lens assembly threaded base is properly seated in the camera housing with desired back focus, the cap is rotated to align the cable 270 with the camera's connecting socket. This rotation is secured via the knob 180 (FIG. 1) that threads through a hole 380 in the filler 210 and can be tightened to bear against the barrel assembly 210, thereby rotationally locking these components together at the desired rotational orientation therebetween.

As shown in FIG. 3, the front end of the filler 210 includes a somewhat rectangular recess 330 to support the shape of the liquid lens 120 in a position at the front of the assembly and in front of the main barrel assembly 220. The filler 210 also includes a flattened top end (shelf) 340 with appropriate raised retaining tabs 342 to support a lens control circuit board 350 according to an illustrative embodiment. The arrangement of the shelf 340, circuit board 350 and cap 110 define a sufficient gap G (FIG. 2) between the inner surface of the cap and the circuit board to provide clearance for the board. In an embodiment, the approximate diameter of the cap is approximately 32 millimeters.

Notably, the barrel assembly 220 is an interchangeable component so that different fixed lens arrangements can be provided in the overall lens assembly (i.e. with the same liquid lens, cap and control circuitry). Thus, this design provides substantial versatility in providing a range of possible focal distances for different vision system applications.

Also notably, the provision of a lens control circuit within the overall structure of the lens assembly allows certain control functions to be localized within the lens itself. This is described in further detail below. The circuit board 350 is connected via a connector 422 and standard ribbon cable 420 to the liquid lens 120 as shown in FIG. 4. The filler 210 provides a gap to run the cable 420 between these components. Additionally, the control circuit board 350 is connected to a cable 270 and multi-pin end connector 272. These are arranged to electrically connect to a receptacle on the camera housing (typically along its front face adjacent to the lens mount). This cable provides power to the lens assembly (the circuit board and liquid lens) from the camera body, and also provides a data interconnect between the lens and the camera's vision system processor, as described in further detail below. A cutout 274 at the rear edge of the cap 110 provides a chase for the cable 270 to pass from the interior to the exterior of the lens assembly 110. Appropriate seals and/or close-tolerance fits prevent incursion of moisture or contaminants from the environment.

Figure 5:
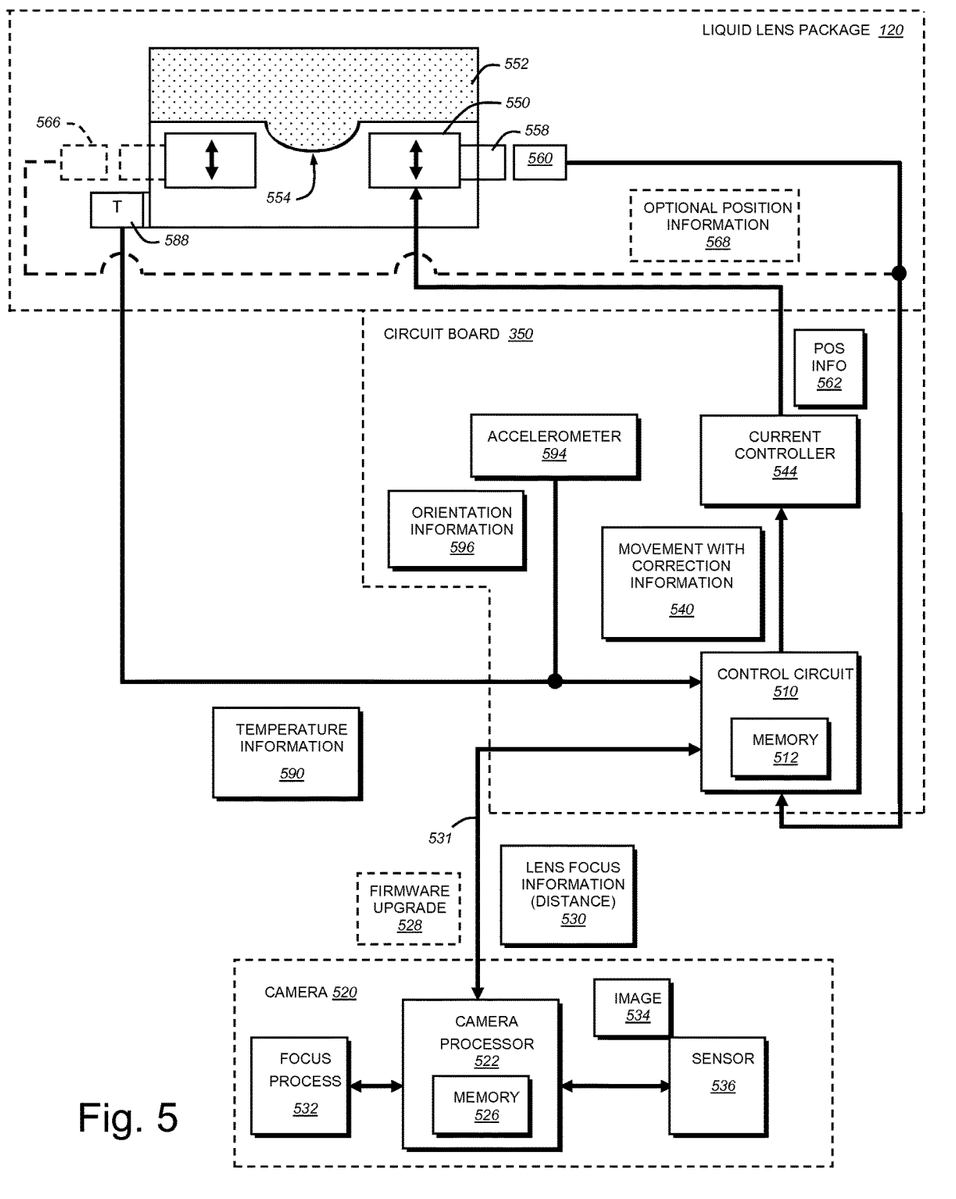
FIG. 5 is a block diagram of the generalized electrical connection and data flow between the liquid lens, integrated controller and camera vision system processor for the lens assembly of FIG. 1.
Figure 6:
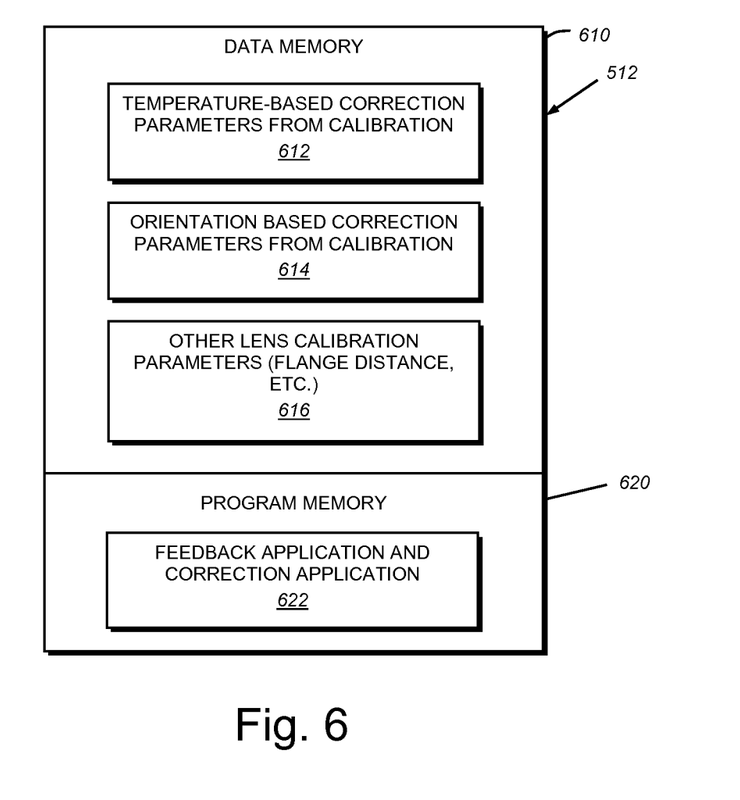
FIG. 6 is a block diagram of the stored data in the control circuit memory of FIG. 5.

The control functions of the circuit board 350 are now described in further detail with reference to FIG. 5. As described above, it has been observed that the drift or lag can be controlled by measuring the position of the actuator and the temperature of the lens and using this data to control the current through the lens actuator bobbin (a magnetic coil that compresses the lens variable under different current settings). In an illustrative embodiment, such drift/lag is compensated by a control circuit 510 (also termed simply "controller") on the circuit board that integrates a (digital) feedback loop completely into the lens barrel of the lens assembly avoiding the use of the camera's vision system processor to control these adjustments. The control circuit includes an associated memory (e.g. an EEPROM) 512 that, as shown in FIG. 6 can be divided into data memory 610 and program memory 620. As described further below, the data memory 610 can include correction parameters for temperature 612, orientation with respect to gravity 614, and other appropriate parameters 616. Such other parameters 616 can include tolerance control parameters, such as the flange tolerance correction (described below). The program memory can include the feedback-loop control software and correction application 622.

At startup, the vision system 520 communicates to the lens assembly circuit 350 the tolerance value of its flange-to-sensor distance. This value is the deviation from the ideal C-mount distance (typically 17.526 millimeters), which has been measured after assembly of the vision system and has been stored in the memory 526 (e.g. a non-volatile flash memory) of the vision system. The control circuit 510 is arranged to correct for the flange tolerance as described further below.

Upon startup, the control circuit 510 can request the vision system processor 522 of the vision system camera 520 to provide the latest firmware upgrade 528 so that the function lens assembly is synchronized with the software and firmware of the vision system. If the firmware is up-to-date, then the processor indicates this state to the lens control circuit and no upgrade is performed. If the firmware is out-of-date, then the new firmware is loaded in the appropriate location of the lens assembly's program memory 620 (FIG. 6). This communication typically occurs over the lens assembly's I2C communication interface (531) transmitted over the cable 270 (FIG. 2).

Note, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software.

The control circuit 510 can be implemented using a variety of electronic hardware. Illustratively a microcontroller is employed. The control circuit 510 receives focus information 530 (e.g. focal distance, which is translated by the controller into target bobbin position) from the vision system camera 520 (i.e. via cable 270 and interface link 531). This focus information can be derived from a focus process 532 that operates in the camera processor 522. The focus process can use conventional or custom auto-focus techniques to determine proper focus. These can include range-finding or stepping through a series of focus values in an effort to generate crisp edges in the image 534 of an object acquired by the sensor 536. While highly variable a 2K×1K-pixel sensor is used in the exemplary embodiment.

The focus information 530 is used by the control circuit 510 to generate a target bobbin position and to provide a digital signal with movement information 540 to the current controller 544. The current controller applies the appropriate current to an annular bobbin assembly 550 (or "bobbin"), which thereby deforms the liquid lens membrane 552 to provide an appropriate convex shape to the bulged lensmatic region 554 within the central opening of the bobbin 550. The bobbin 550 includes a magnet 558 that passes over a conventional linear Hall sensor 560. This Hall sensor 560 generates a digital position signal 562 that is directed back to the control circuit 510 where it is analyzed for actual bobbin position (for example, calling up values in the memory 512) versus the target position represented by a corresponding Hall sensor target position. If, in a comparison of the actual Hall sensor value and target Hall sensor value, these values do not match, then the control circuit 510 applies a correction, and that is delivered to the current controller 544, where it is used to move the bobbin 550 to a correct position that conforms with the target Hall sensor position. Once the bobbin 550 is at the correct position, the controller can signal that correction is complete.

Note that additional Hall sensors (or other position-sensing devices) 566 (shown in phantom) can generate additional (optional) position signals 568 that are used by the control circuit to verify and/or supplement the signal of sensor 560. In an embodiment, data is transmitted between components using an I2C protocol, but other protocols are expressly contemplated. In general, the commercially available Hall sensor operates in the digital realm (i.e. using the I2C interface protocol), thereby effectively avoiding signal interference due to magnetic effects. By way of non-limiting example, a model AS5510 Hall linear sensor (or sensors) available from AustriaMicrosystems (AMS) of Austria can be used.

Figure 5A:
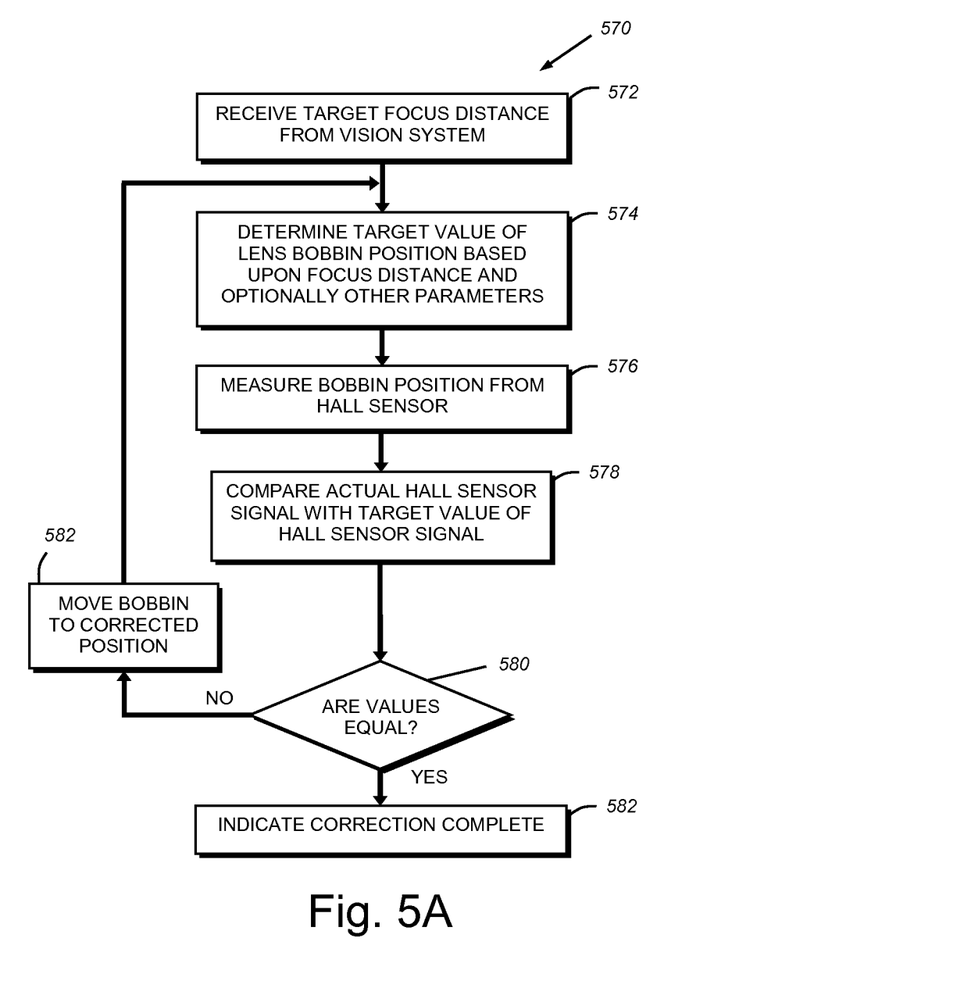
FIG. 5A is a flow diagram of a feedback loop-based bobbin position control process for the lens assembly of FIG. 1.

With reference to FIG. 5A, a bobbin position-sensing/correcting feedback loop process 570 is shown in a series of flow-diagram process steps. A target focus distance is received from the vision system processor in step 572. The control feedback loop 570 then initiates as this focus distance is used by the lens assembly control circuit (controller) 510 to determine a target value for bobbin position represented by a target Hall sensor value provided by one or more sensors on the bobbin. The target Hall sensor value(s) can be corrected based upon stored parameters in memory 512 (step 574). Such parameters include, but are not limited to temperature, spatial orientation and flange-to-sensor-distance tolerance, and this (optional) process is described further below. In step 576, the control circuit 510 measures the actual position of the bobbin based upon the position of the Hall sensor(s) and associated signal value(s) (562). In step 578, the control circuit 510 then compares the actual, returned Hall sensor value(s) with the target value. If the values are not substantially equal then decision step 580 branches to step 582 and the control circuit directs the current controller 544 to input a current that will move the bobbin to the corrected position. This can be based on the difference in current needed to move the bobbin between the actual and correct position. If the comparison in step 578 determines that the actual and target Hall sensor value(s) are substantially equal, then the decision step 580 branches to step 582 and the system indicates that correction is complete. The control circuit repeats correction steps 574, 576, 578, 580 and 582 until the actual and target Hall sensor values are substantially equal (within an acceptable tolerance), and the new correct bobbin position is indicated. This complete status can be reported to the camera's processor 522 for use in performing image acquisition.

Note that this local feedback loop 570 can run continuously to maintain focus at a set position once established, and until a new bobbin position/focus is directed by the camera. Thus, the feedback loop 570 ensures a steady and continuing focus throughout the image acquisition of an object, and does so in a manner that avoids increased burdens on the camera's vision system processor.

The determination of the target value for the Hall sensor (s) in step 574 can include optional temperature, spatial orientation and/or other parameter (e.g. flange distance) correction based upon parameters 612, 614, 616 (FIG. 6) stored in memory 512. Temperature of the lens unit is sensed (optionally) by an on-board or adjacent temperature sensor

588 (FIG. 5). The temperature sensor 588, like other components of the circuit 350, can employ a standard interface protocol (e.g. I2C).

Figure 7:
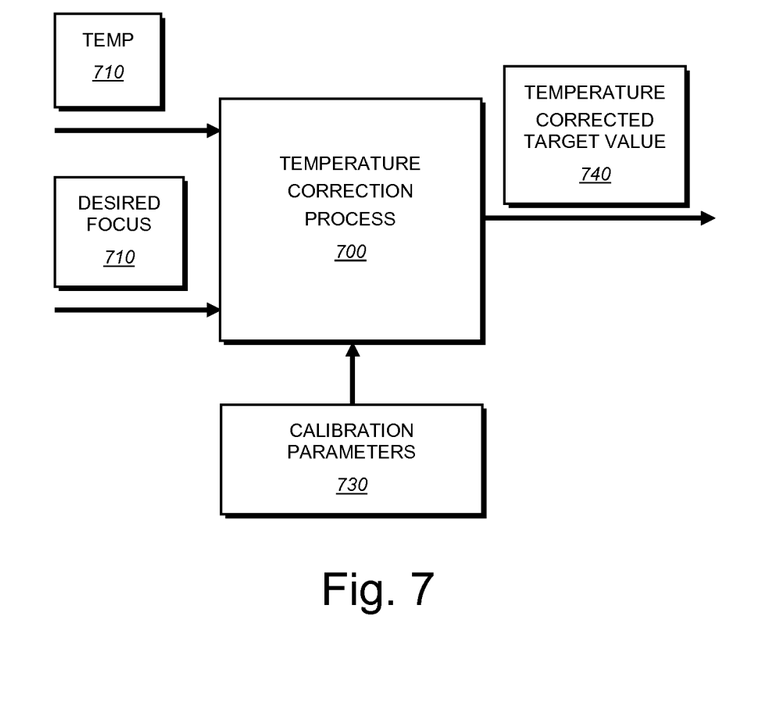
FIG. 7 is a temperature correction process that generates temperature-corrected bobbin position values for use with the control circuit of FIG. 5 and process of FIG. 5A.

As shown in FIG. 7, an optional temperature compensation process 700 operating within the control circuit 510 receives a temperature reading 710 from the sensor 536 and target focus or bobbin position information 720 and applies temperature calibration parameters 730. These can be stored locally on the lens assembly circuit memory 512 as shown in FIG. 6. The correction parameters can define a curve or a series of table values associated with given temperature readings that are measured during calibration. The process 700 modifies the target Hall sensor value (and associated bobbin position) from a base value, based upon the focus distance provided by the vision system camera to a value that accounts for the variation of lens focus with respect to lens temperature. Thus, the base Hall sensor value can be added-to or subtracted from by the control circuit 510 based upon the prevailing temperature reading at the lens to generate a temperature corrected target value 740.

Likewise, correction for orientation with respect to gravity that can result in sag or other geometric deformation of the lens membrane in differing ways is compensated by an (optional) accelerometer 594 that transmits the spatial orientation 596 of the lens/camera with respect to the acting directing of gravity to the control circuit via, for example, an I2C protocol. In an embodiment, an orientation correction factor is determined (by reading the accelerometer 594), and applied to the target Hall sensor value by the control circuit in a manner similar to temperature correction (FIG. 7) substituting orientation for temperature in block 710. Since orientation typically remains constant (except in the case of a moving camera), the determination of orientation can be a one-time event (i.e. at camera setup/calibration), or can occur upon start up or at a timed interval based upon the control circuit's clock. Like temperature correction, orientation correction parameters can comprise a curve or lookup table mapped to differing orientations, which can be determined during calibration. The appropriate orientation parameter value is applied to the step of determining (574) the target Hall sensor value, and the target value is adjusted to include this further correction for spatial orientation. Note that in the case of a moving camera, the orientation parameter can be continuously updated in the same manner that temperature is updated to account for changes over time.

Other parameters (616 in FIG. 6), such as flange-to-sensor distance tolerance, can also be stored in the circuit memory 512. These parameters can be updated from the data store of the vision system camera upon startup or at another interval of time. The value of each parameter is used by the control circuit's process to further adjust and correct the target Hall sensor value. This overall corrected value is used in the comparison step 578 against the actual measured value to thereby move the bobbin to the correct position.

It should be clear that superior position correction, on the order of 1 millisecond, can be achieved using the local feedback loop instantiated in a control circuit packaged in the lens assembly. The entire lens assembly package fits within a standard C-mount lens affording a high degree of interoperability with a wide range of vision system camera models and types. The system and method for controlling and correcting the focus of a liquid (or other similar autofocusing) lens described herein can be employed rapidly, and at any time during camera runtime operation and generally free of burden to the camera's vision system processor. This system and method also desirably accounts for variations in focus due to thermal conditions and spatial orientation (i.e. lens sag due to gravity). This system and method more generally allow for a lens assembly that mounts in a conventional camera base.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while a Hall sensor is used to measure position, a variety of alternate position-sensing devices can be used in association with the feedback loop herein. For example an optical/interference-based position sensor can be employed in alternate embodiments. Also, it is contemplated that the principles herein can be applied to a variety of lenses (liquid and otherwise), in which the curvature of the lens is varied via electronic control. Thus the term "variable lens assembly" should be taken broadly to expressly include at least such lens types. In addition while various bobbin position corrections are performed within the lens control circuit and feedback loop, it is contemplated that some corrections can be performed within the vision system camera processor, and the corrected focal distance is then sent to the lens assembly for use in further feedback loop operations. As used herein, various directional and orientation terms such as "vertical", "horizontal", "up", "down", "bottom", "top", "side", "front", "rear", "left", "right", and the like, are used only as relative conventions and not as absolute orientations with respect to a fixed coordinate system, such as gravity. Accordingly, this description is meant to be taken only by way of example, and not to otherwise limit the scope of this invention.

What is claimed is:

1. A lens assembly for a vision system camera having variable focus comprising:
   a lens body having a variable lens assembly and a fixed optics assembly; and
   a controller that is located within the body, the controller being constructed and arranged to receive a target focal distance from the vision system camera, the controller generating a target position of an actuator that controls curvature of the variable lens assembly and based upon an actual measured position of the actuator, correcting the measured position of the actuator to the target position.

2. The lens assembly as set forth in claim 1 wherein the variable lens assembly comprises a membrane-based liquid lens assembly and further comprising a position sensor located to measure movement of the actuator, wherein the actuator is associated with movement of a membrane of the membrane-based liquid lens assembly.

3. The lens assembly as set forth in claim 2 wherein the position sensor comprises at least one Hall sensor.

4. The lens assembly as set forth in claim 2 wherein the actuator comprises a current-driven bobbin and the controller is operatively connected with a current controller that provides current to the bobbin.

5. The lens assembly as set forth in claim 2 wherein the target position information defines a position that focuses an image acquired by the vision system camera.

6. The lens assembly as set forth in claim 2 wherein the target position information defines position information that is further corrected for at least one of temperature of the liquid lens assembly, spatial orientation of the liquid lens assembly and flange-to-sensor distance tolerance.

7. The lens assembly as set forth in claim 6 further comprising at least one of a temperature sensor and an accelerometer located in the lens body.

8. The lens assembly as set forth in claim 6 wherein the corrected position information is determined by the controller based upon calibration parameters stored in a memory operatively connected to the controller and located in the lens assembly.

9. The lens assembly as set forth in claim 1 wherein the controller is constructed and arranged to receive, from the vision system camera, a firmware update for storage in a memory operatively connected to the controller and located in the lens assembly when a current firmware version in the memory is out-of-date compared to a version stored by the vision system camera.

10. The lens assembly as set forth in claim 1 wherein the controller is located on a circuit board mounted on a shelf that is surrounded by a cap assembly.

11. The lens assembly as set forth in claim 10 further comprising a power and data cable electrically connected to the circuit board and extending to a removably connected location on the vision system camera for communication with a vision system processor therein.

12. The lens assembly as set forth in claim 10 wherein the cap assembly surrounds a filler having the shelf and a main barrel assembly that contains the fixed optics therein.

13. The lens assembly as set forth in claim 12 wherein the cap assembly is operatively connected to the filler, the filler containing the shelf, and being selectively rotatable about an optical axis with respect to the main barrel assembly, the main barrel assembly including a mount base constructed and arranged to removably secure to a mount of the vision system camera.

14. The lens assembly as set forth in claim 1 wherein the controller indicates when the lens position has moved to a corrected position.

15. The lens assembly as set forth in claim 1 wherein the lens body includes a C-mount base.

16. A lens assembly for a vision system camera having variable focus comprising:
   a lens body having a variable lens assembly and a fixed optics assembly; and
   a controller that is located within the body, the controller receiving a target focal distance from the vision system camera, the controller generating a target position of an actuator that controls curvature of the variable lens assembly and based upon an actual measured position of the actuator, correcting the measured position of the actuator to the target position.

17. The lens assembly as set forth in claim 16 wherein the variable lens assembly comprises a membrane-based liquid lens assembly and further comprising a position sensor located to measure movement of the actuator, wherein the actuator is associated with movement of a membrane of the membrane-based liquid lens assembly.

18. The lens assembly as set forth in claim 17 wherein the position sensor comprises at least one Hall sensor.

19. The lens assembly as set forth in claim 17 wherein the actuator comprises a current-driven bobbin and the controller is operatively connected with a current controller that provides current to the bobbin.

20. The lens assembly as set forth in claim 17 wherein the target position information defines a position that focuses an image acquired by the vision system camera.

21. The lens assembly as set forth in claim 17 wherein the target position information defines position information that is further corrected for at least one of temperature of the liquid lens assembly, spatial orientation of the liquid lens assembly and flange-to-sensor distance tolerance.

22. The lens assembly as set forth in claim 21 further comprising at least one of a temperature sensor and an accelerometer located in the lens body.

23. The lens assembly as set forth in claim 21 wherein the corrected position information is determined by the controller based upon calibration parameters stored in a memory operatively connected to the controller and located in the lens assembly.

24. The lens assembly as set forth in claim 16 wherein the controller is constructed and arranged to receive, from the vision system camera, a firmware update for storage in a memory operatively connected to the controller and located in the lens assembly when a current firmware version in the memory is out-of- date compared to a version stored by the vision system camera.

25. The lens assembly as set forth in claim 16 wherein the controller is located on a circuit board mounted on a shelf that is surrounded by a cap assembly.

26. The lens assembly as set forth in claim 25 further comprising a power and data cable electrically connected to the circuit board and extending to a removably connected location on the vision system camera for communication with a vision system processor therein.

27. The lens assembly as set forth in claim 25 wherein the cap assembly surrounds a filler having the shelf and a main barrel assembly that contains the fixed optics therein.

28. The lens assembly as set forth in claim 27 wherein the cap assembly is operatively connected to the filler, the filler containing the shelf, and being selectively rotatable about an optical axis with respect to the main barrel assembly, the main barrel assembly including a mount base constructed and arranged to removably secure to a mount of the vision system camera.

29. The lens assembly as set forth in claim 16 wherein the controller indicates when the lens position has moved to a corrected position.

30. The lens assembly as set forth in claim 16 wherein the lens body includes a C-mount base.

31. A lens assembly for a vision system camera having variable focus comprising:
   a lens body having a variable lens assembly and a fixed optics assembly; and
   a controller that is located within the body, the controller being constructed and arranged to receive a target focal distance from the vision system camera, the controller generating a target position of an actuator that controls curvature of the variable lens assembly and based upon an actual measured position of the actuator, correcting the measured position of the actuator to the target position,
   wherein the variable lens assembly comprises a membrane-based liquid lens assembly and further comprising a position sensor located to measure movement of the actuator, wherein the actuator is associated with movement of a membrane of the membrane-based liquid lens assembly.

* * * * *